March 25, 1958 J. E. CONACHER 2,828,100
AUTOMATIC WEIGHING APPARATUS
Filed March 24, 1952 7 Sheets-Sheet 1

Inventor
James E. Conacher
his Attorneys

March 25, 1958

J. E. CONACHER 2,828,100

AUTOMATIC WEIGHING APPARATUS

Filed March 24, 1952

7 Sheets-Sheet 4

Inventor
James E. Conacher
by Hooper, Leonard & Glenn
his Attorneys

Inventor
James E. Conacher

March 25, 1958 J. E. CONACHER 2,828,100
AUTOMATIC WEIGHING APPARATUS
Filed March 24, 1952 7 Sheets-Sheet 6

Inventor
James E. Conacher

March 25, 1958     J. E. CONACHER     2,828,100
AUTOMATIC WEIGHING APPARATUS
Filed March 24, 1952     7 Sheets-Sheet 7

INVENTOR.
JAMES E. CONACHER

United States Patent Office 2,828,100
Patented Mar. 25, 1958

2,828,100

AUTOMATIC WEIGHING APPARATUS

James Ernest Conacher, London, England, assignor to Blaw-Knox Company, Pittsburgh, Pa., a corporation of Delaware Application March 24, 1952, Serial No. 280,809

Claims priority, application Great Britain March 29, 1951

2 Claims. (Cl. 249—14)

The invention relates to automatic weighing machines, the machines being particularly, although not exclusively, applicable for use in the batching of constituents used in the production of cement concrete.

According to the present invention there is provided a weighing machine having a weighing unit comprising a movable member for attachment to a weighing scale having material to be weighed fed thereto, load resisting means securing said member to the machine frame so that said member is movable with respect to the frame to an extent dependent on the magnitude of the load on said scale, and at least three switches arranged to be operated successively by movement of said member as the magnitude of the load increases, the first switch to be operated during loading being connectable for causing the rate of flow of material to the scale to be decreased, the second switch to be operated being connectable for causing the flow of material to the scale to cease, and the third switch being operated on those occasions when the scale has been loaded with material to more than the desired extent, the third switch being connectable to give an indication that overloading has taken place.

Figure 1:
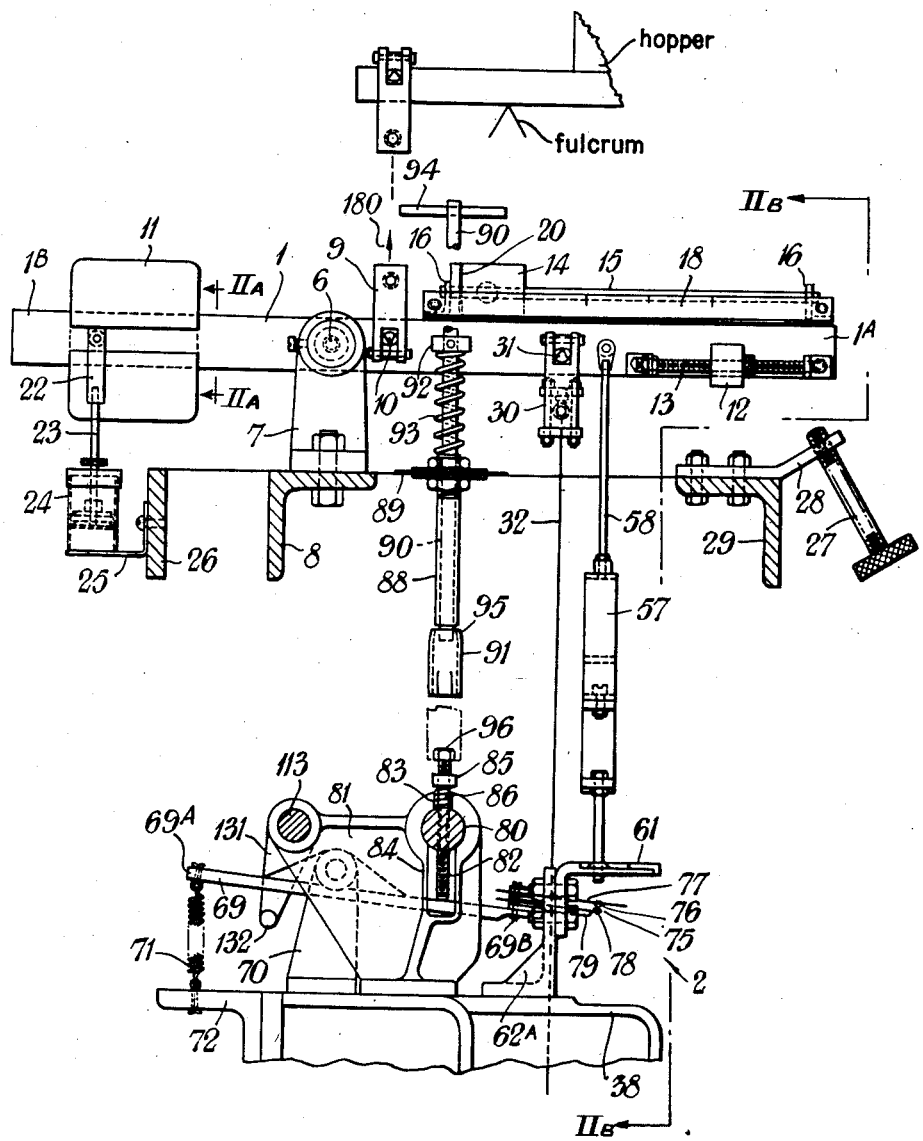
Figure 2:
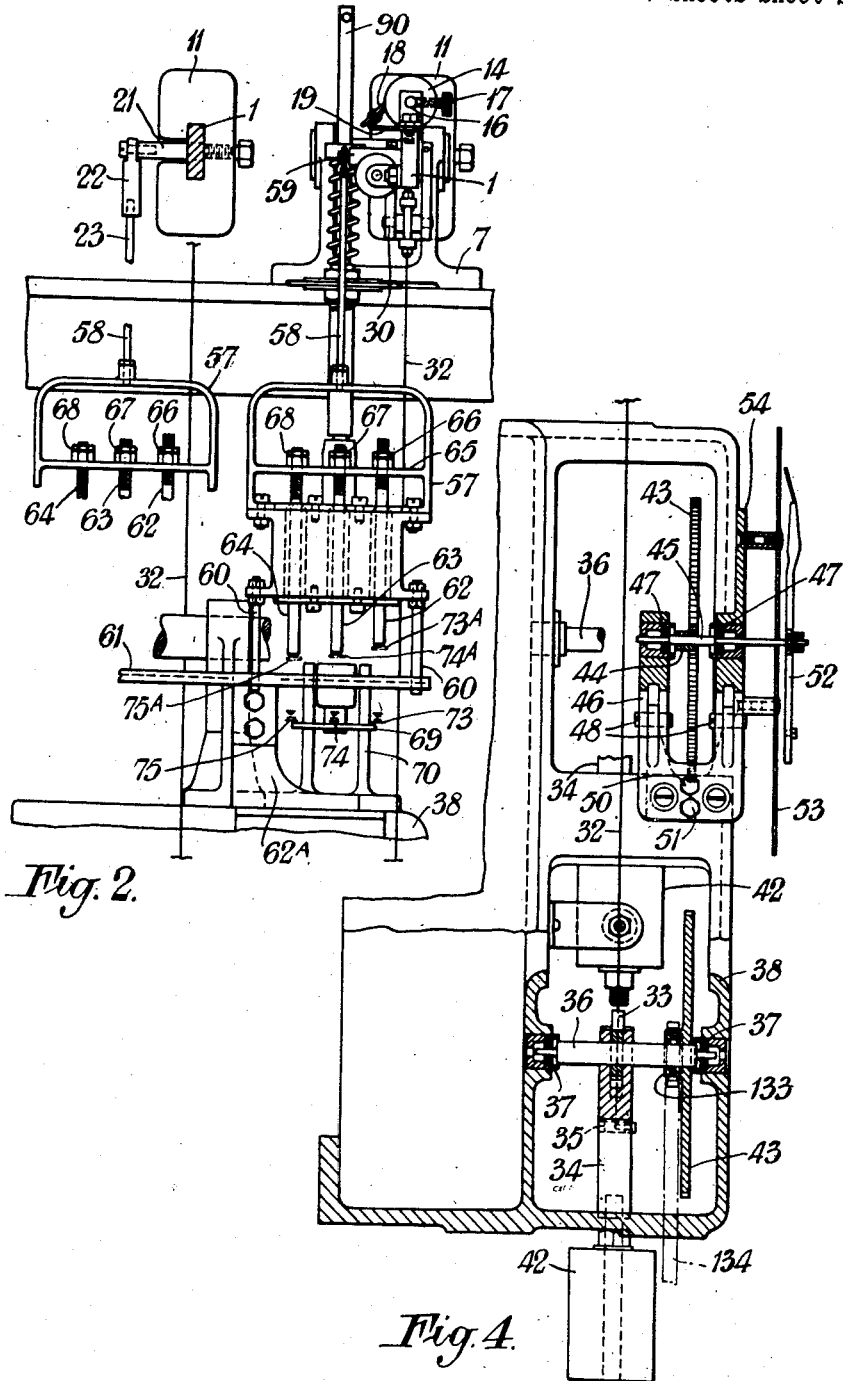
Figure 3:
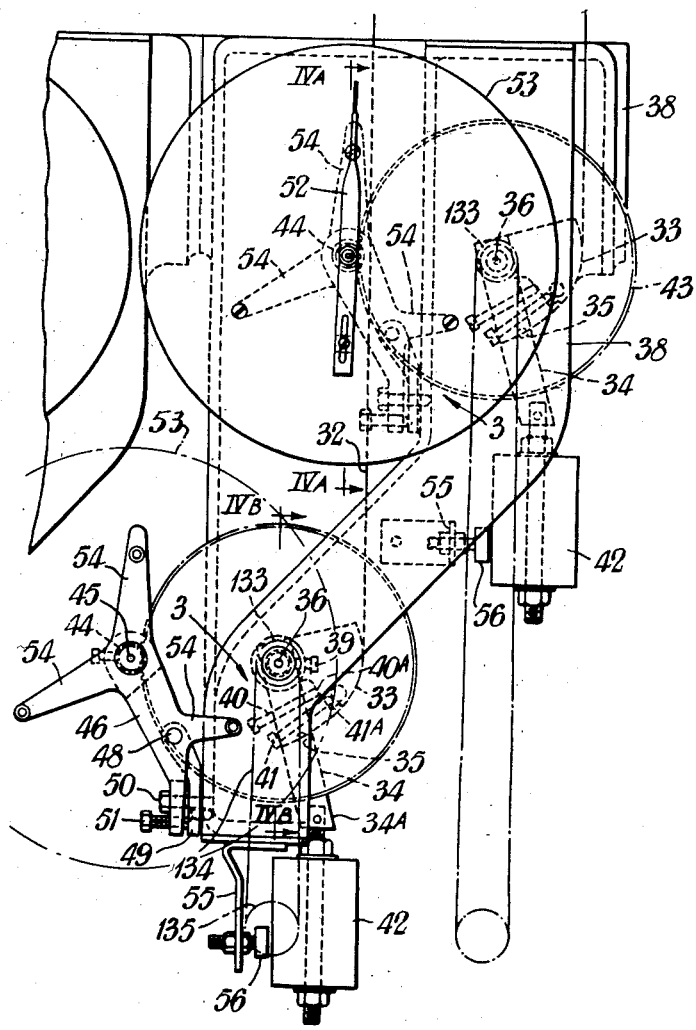
Figure 5:
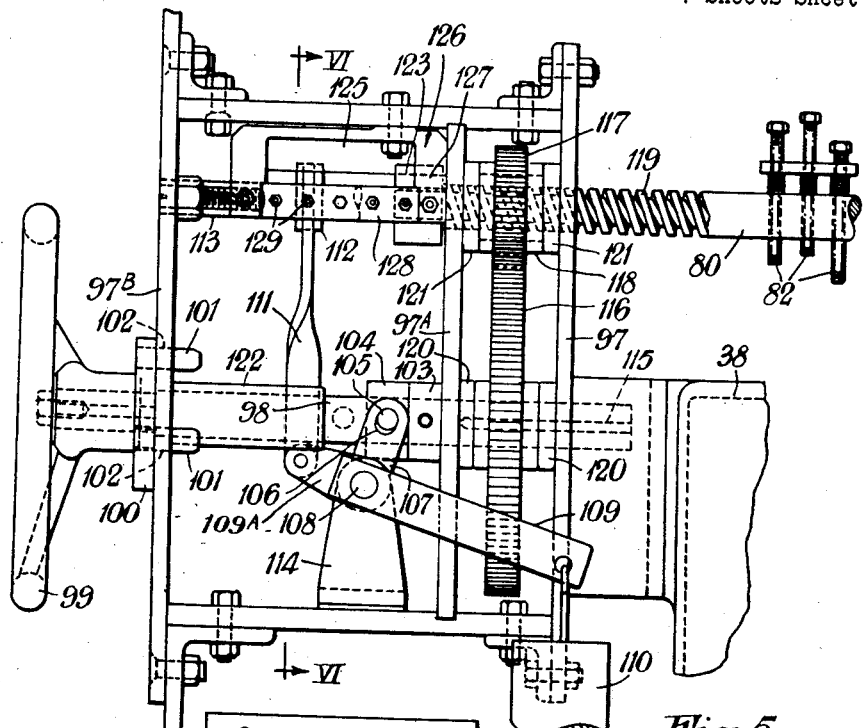
Figure 6:
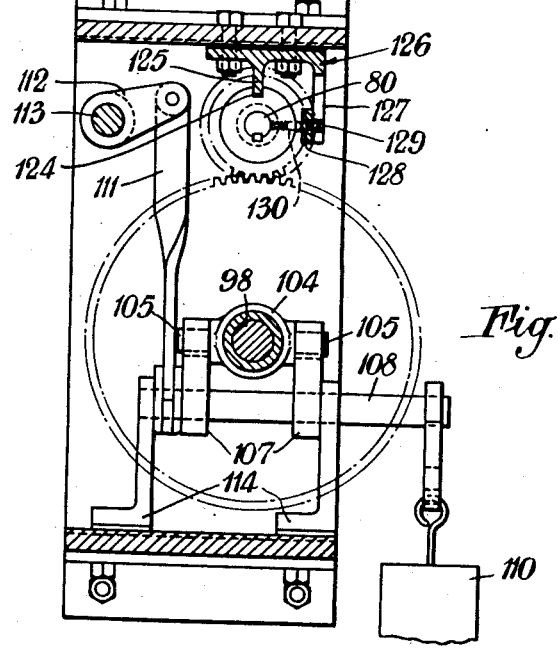
Figure 7:
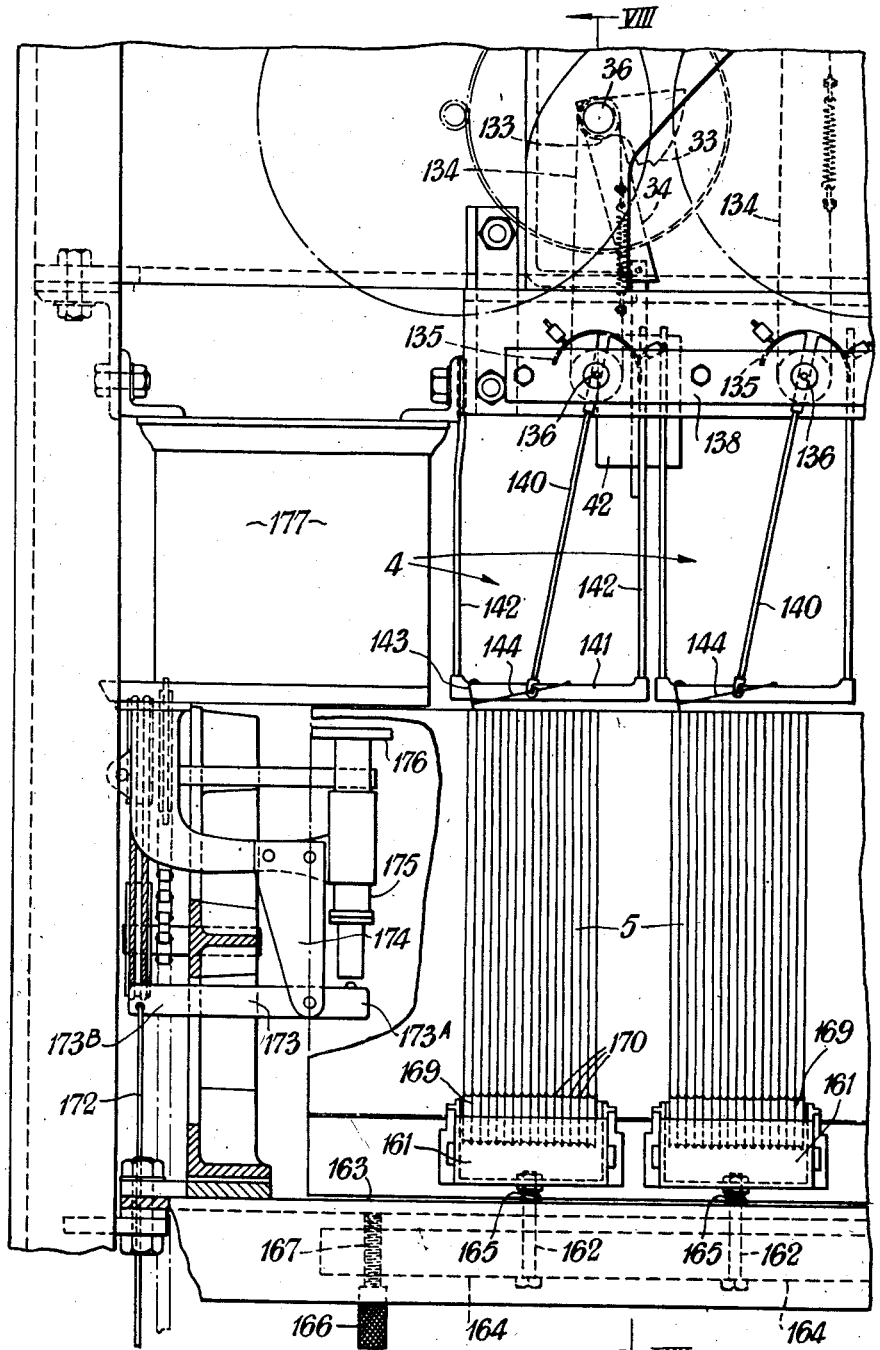
Figure 8:
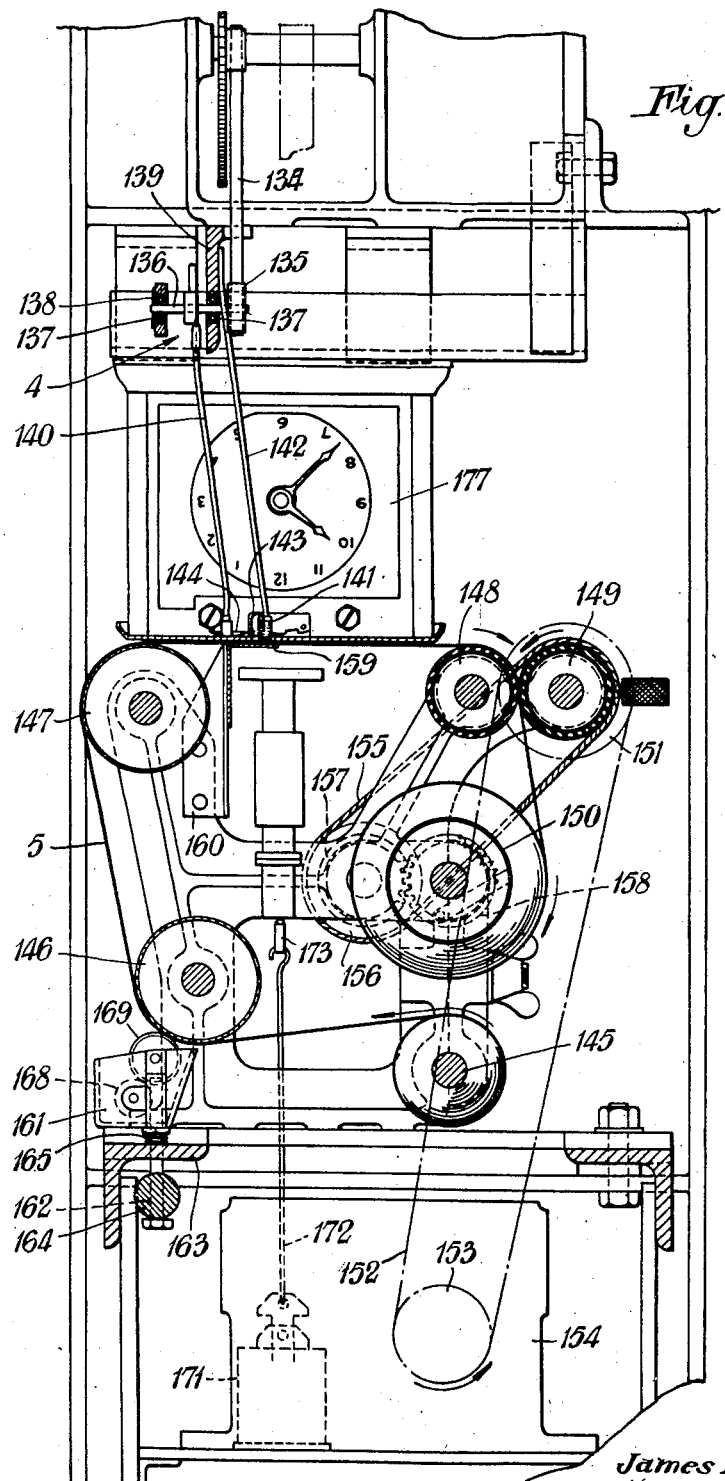
Figure 9:
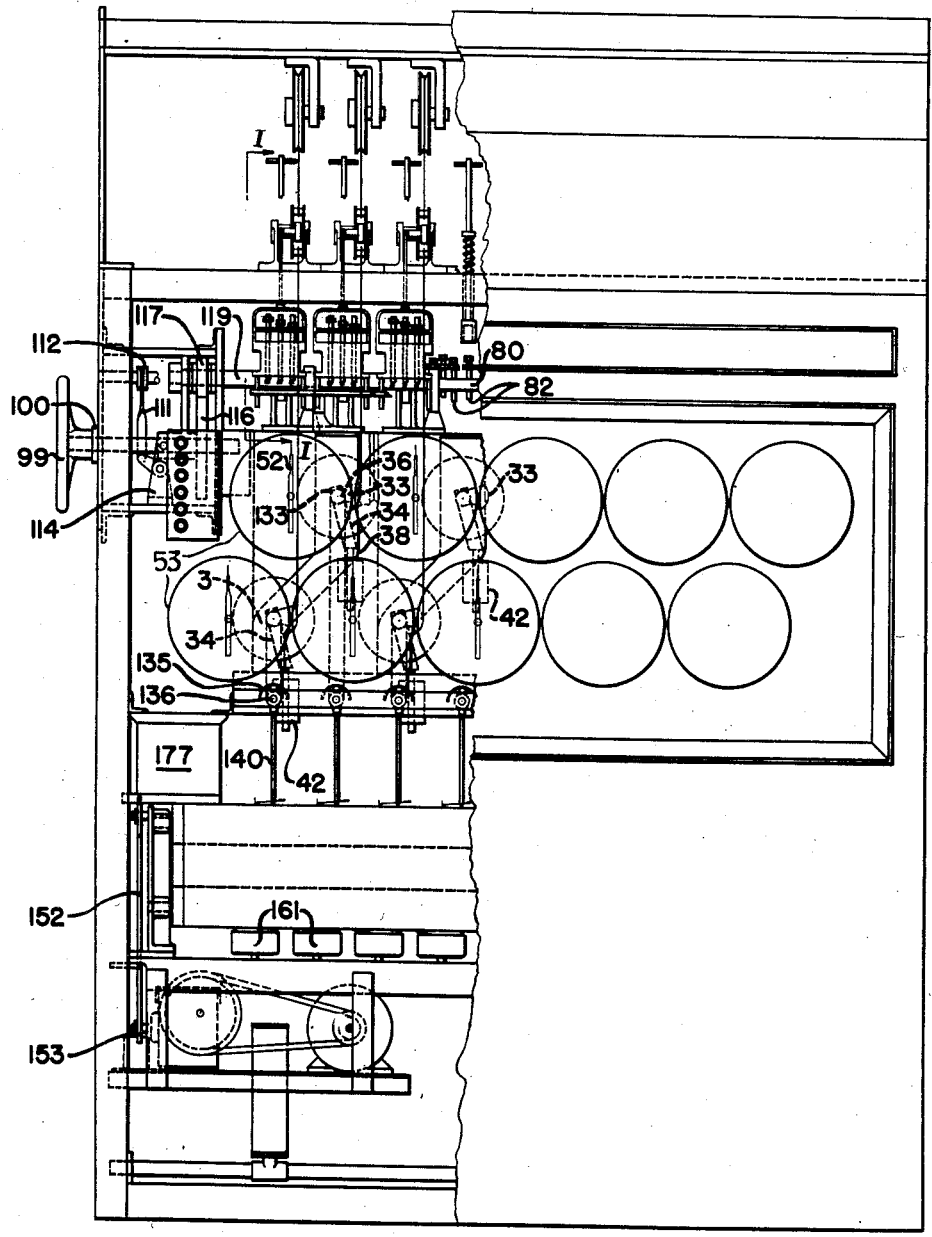

For a better understanding of the invention and the method of carrying it into effect, reference will now be made to the accompanying drawings, in which:

Figure 1 is a semi-diagrammatic end elevation of the lever and cut-off mechanism of one weighing unit of an automatic weighing machine, taken on I—I of Figure 9, most of the frame of the machine having been omitted for the sake of clarity, Figure 2 is a front elevation, partly cut away, of part of some of the lever and cut-off mechanisms of the machine of Figure 1 with part sections on IIA—IIA and IIB—IIB of Figure 1 and showing two weighing units side-by-side, Figure 3 is a front elevation of the weighing dial mechanism of the two units of Figure 2, Figure 4 is a cross-sectional elevation, partly on IVA—IVA of Figure 3 and partly on IVB—IVB of Figure 3, Figure 5 is a front elevation, partly cut away, of the mix change operating mechanism of the weighing machine, Figure 6 is a section on VI—VI of Figure 5, Figure 7 is a front elevation of that part of the recording mechanism of the machine that is associated with the two left-hand units of the weighing machine, Figure 8 is a section on VIII—VIII of Figure 7, some of the parts having been omitted, and Figure 9 is a front elevational view of the recording mechanism having the front panel partly cut away.

The weighing machine shown in the drawings has a plurality of weighing units, each unit serving automatically to indicate the weight of the contents of an associated hopper whilst the latter is being filled with, for example, sand, water, cement, or ballast, and also serving automatically to cut-off further filling of the associated hopper when the latter has been filled with the desired weight of material. The hoppers and the connections between the hoppers and the weighing units are not shown. Each weighing unit has a weighing lever 1 (Figures 1 and 2), a cut-off mechanism 2 (Figures 1 and 2), a weighing dial mechanism 3 (Figures 3 and 4) and inking mechanism 4 (Figures 7 and 8). The machine has a single mix control mechanism (Figures 5 and 6) which can be manipulated to vary the operation of all the cut-off mechanisms 2 of all the separate weighing units. The weighing machine has a single recording mechanism (Figures 7 and 8) which in conjunction with the inking mechanisms 4 records on a chart 5 the weights of material delivered to the various hoppers.

Referring now in greater detail to the construction of the machine, the lever 1 (Figures 1 and 2) is pivoted at 6 to a bracket 7 supported on a frame member 8. A shackle 9 is arranged to apply a load to the lever 1 through the intermediary of a knife edge 10 on the lever. The shackle 9 is connected to one end of a load transmitting cable (not shown), the other end of the cable being connected to a weighing scale which supports the associated hopper. The hopper has a first pneumatic ram associated therewith for operating the outlet from the hopper and a second pneumatic ram for opening and closing a feed control gate thereby to permit, or prevent, respectively, flow of material into the hopper. The air flow to both pneumatic rams is electrically controlled.

A balance weight 11 is mounted on the lever 1 in such a way that it can be adjusted longitudinally of the lever 1. This weight 11 serves to counterbalance the weight of the empty hopper. A fine adjustment weight 12 is mounted on a threaded shaft 13 on the end 1A of the lever 1.

A water content compensating weight 14 is slidably mounted on a bar 15 disposed parallel to the lever 1. The ends of the bar 15 are secured to brackets 16 mounted on the lever 1. The weight 14 carries a set screw 17 which can be tightened to lock the weight 14 to the bar 15 at any desired position along the bar 15. A graduated plate 18 is supported from the lever 1 by brackets 19. The weight 14 has a marker 20 engraved thereon, for registering with the graduations on the plate 18.

The end 1B of the lever 1 has a laterally extending pin 21 (Figure 2) which is connected by a shackle 22 to a rod 23 which carries the piston (as shown in Figure 1) of a dashpot 24. The dashpot 24 is secured by a bracket 25 to a frame member 26 and serves to prevent rapid uncontrolled movement of the lever 1 about its pivot.

A pre-set screw 27 is threadedly engaged in a plate 28 mounted on a frame member 29. The screw 27 is positioned so that it can be screwed through the plate 28 to encounter the end 1A of the lever 1, thereby to force the lever in a counterclockwise direction about its pivot 6.

A shackle 30 is connected to the lever 1 through the intermediary of a knife edge 31. One end of a wire 32 is secured to the shackle 30, and the other end of the wire is passed around the arcuate periphery of a segment 33 (Figures 3 and 4), the extremity of this other end being secured to an arm 34 at 35.

On each weighing unit with the arm 34 and segment 33 are effectively secured to a shaft 36, the ends of which are pivotally supported through the intermediary of ball races 37 in a casting 38. The arm 34 is rigidly secured to the shaft 36 by means of a locking screw 39 (Figure 3) and the segment 33 is adjustably secured to the arm 34 by means of bolts 40 and 41. The bolt 40 threadedly engages the arm 34 and the end 40A of this bolt abuts against the segment 33. The bolt 41 is freely slidable through the arm 34 and the end 41A of this bolt is threadedly engaged in the segment 33. The angular position of the segment 33 with respect to the arm 34 can therefore be adjusted by first setting the bolt 40 in the desired position and then tightening the bolt 41 until the head thereof abuts against the arm 34.

The free end 34A of the arm 34 has a weight 42 pivotally secured thereto.

A gear wheel 43 is keyed to the shaft 36 and this gear wheel meshes with a pinion 44 fixed on a shaft 45 which is pivotally supported in a bracket 46 through the intermediary of ball bearings 47. The bracket 46 is pivotally supported on two pins 48 carried by a bracket 49. A bolt 50 which passes freely through holes in the brackets 46 and 49 engages in a threaded hole in the casting 38. A bolt 51 threadedly engages in a hole in the bracket 46 the free end of this bolt passing through the bracket 46 and abutting against the bracket 49. When the two bolts 50 and 51 are tight the bracket 46 is rigidly secured to the bracket 49 and the two brackets are rigidly secured to the casting 38. It will be realised that the bracket 46 may be angularly adjusted with respect to the bracket 49 so that the mesh of the gears 43 and 44 can be varied, the adjustment being effected by loosening one of the bolts 50, 51 and tightening the other.

The shaft 45 carries a pointer 52 which can move over a dial 53 which is supported from arms 54 of the bracket 46. The dial 53 carries graduations for indicating weight.

A bracket 55 secured to the casting 38 carries an adjustable stop 56 for limiting clockwise movement of the weight 42 about the shaft 36.

A contact housing 57 (Figures 1 and 2) is supported from each lever 1 by means of a rod 58 the upper end of which is pivotally secured on the free end of a pin 59 projecting laterally from the lever 1. The housing 57 has two depending guide rods 60, which ride in guide holes in a guide plate 61 supported by a bracket 62A from the casting 38. Three contact rods 62, 63, 64 are carried by the housing 57. The rods 62, 63, 64 are slidable vertically with respect to the housing 57, the upper ends of these rods passing through a crossbar 65 integral with the housing 57. The upper ends of the rods 62, 63, 64 have nuts 66, 67 and 68 thereon which nuts encounter the crossbar 65 to limit downward movement of the rods with respect to the housing 57. The nuts 66, 67 and 68 are appropriately positioned on their associated rods so that when the nuts encounter the bar 65, the lower end of the rod 64 is below the lower ends of the rods 62 and 63, and the lower end of the rod 63 is below the lower end of the rod 62.

A platform 69 is pivotally supported by a bracket 70 mounted on the casting 38. The end 69A of the platform 69 is urged downwards by a spring 71 the lower end of which is fixed to a bracket 72 fixed to the casting 38. The end 69B of the platform 69 carries three contact switches 73, 74 and 75. The switch 73 co-operates with the rod 62, the switch 74 with the rod 63 and the switch 75 with the rod 64. For the sake of clarity, the platform 69 has been turned about its pivot to an exaggerated extent, so that the switches 73, 74 and 75 are below their usual operating positions. A usual operating position of the switches is shown by the dotted lines 73A, 74A and 75A in Figure 2.

Each contact switch 73, 74, 75 has an upper contact 76 mounted on a spring strip 77 and a lower contact 78 mounted on a spring strip 79. The spring strips 77 and 79 are arranged so that the contacts 76 and 78 are spring urged apart.

A shaft 80 is supported by a bracket 81 mounted on the casting 38. The shaft 80 has a plurality of threaded bolts 82 screwed therethrough. The bracket 81 has elongated slots 83, 84 in which upper and lower portions of the bolts 82 are located. By virtue of the provision of these slots, the shaft 80 can be slid axially with respect to the bracket 81. A nut 85 is threaded on the upper portion of each bolt 82 and a spring 86 is located between the nut 85 and the shaft 80. The nut 85 and spring 86 serve to resist rotation of the bolt 82 with respect to the shaft 80 sufficiently to prevent the bolt 82 from turning when the weighing machine is in use.

The upper end of a hollow tube 88 is secured to the top 89 of the weighing machine. A shaft 90 is passed through the tube 88. The lower end of the shaft carries a box spanner 91. The upper portion of the shaft has a collar 92 secured thereto and a spring 93 is disposed between the collar 92 and the top 89. The upper end of the shaft 88 carries a handle 94. A shoulder 95 is formed where the spanner 91 is secured on the shaft 88, this shoulder serving as a stop limiting upward movement of the shaft 90 in the tube 88 when the shoulder 95 encounters the lower end of the tube 88. By bearing on the handle 94, the shaft 88 and spanner 91 may be forced downwardly against the action of the spring 93 so that the spanner 91 engages over the head 96 of the bolt 82. The handle 94 can then be turned so that the amount by which the bolt 82 projects through the shaft can be varied, thereby to vary the inclination of the platform 69 which is urged against the lower end of the bolt 82 by the spring 71.

Fixed to the left-hand end of the casting 38, when viewed in the same direction as in Figure 2, is a framework 97 which supports the mix change operating mechanism. An axially slidable shaft 98 is mounted in the framework 97 and has a handwheel 99 secured to one end thereof. A plate 100 having three pins 101 spaced at equiangular intervals around the axis of the shaft 98 is secured to the handwheel 99. The pins 101 engage in three holes 102 in the frame member 97B of the framework. A collar 103 is fixed on the shaft and abuts against a yoke 104 slidable on the shaft 98 and having pins 105 which engage in slotted holes 106 in yoke arms 107. The yoke arms 107 are secured on a shaft 108 which carries levers 109 and 109A. The free end of the lever 109 has a weight 110 suspended therefrom and the lever 109A is pivotally secured to the lower end of a link 111 the upper end of which is pivotally secured to an arm 112 fixed on a shaft 113. The shaft 108 is pivotally supported in brackets 114 secured to the framework 97 and the shaft 113 is pivotally supported in the framework 97 and in the brackets 81 (Figure 1).

The shaft 98 has an axially extending slot 115 in which is located a key (not shown) which secures a gear wheel 116 mounted on the shaft 98 against axial rotation with respect to the shaft 98. The gear wheel 116 meshes with a pinion 117 formed on a nut 118 which engages on a quick threaded portion 119 of the shaft 80. The gear wheel 116 is located between bosses 120 on members of the framework 97 and the nut 118 is located between bosses 121 on the same members.

Axial movement of the shaft 98 is limited in one direction by the collar 103 encountering the member 97A of the framework 97 and in the other direction by the yoke 104 encountering a sleeve 122 carried by the shaft 98 and located between the yoke 104 and the member 97B.

The left-hand end (Figure 5) of the shaft 80 carries a collar 123 keyed thereon. The collar has a slot 124 in which is engaged a flange 125 of a switch supporting bracket 126 which latter is secured to the framework 97. Engagement between the flange 125 and slot 124 prevents the shaft 80 from rotating about its longitudinal axis. The bracket 126 has two depending lugs 127 between which is supported an insulating strip 128. The strip 128 carries a plurality of terminals 129, the number of terminals being the same as the number of bolts 82 associated with each individual weighing unit. The collar 123 carries a spring loaded plunger 130 for encountering the terminals 129.

The shaft 113 has a plurality of arms 131 (Figure 1), the number of arms being the same as the number of weighing units in the weighing machine. Each arm 131 has a boss 132 arranged for engaging under the end 69A of the associated platform 69, when the shaft 113 is turned in a clockwise direction (Figure 1).

Each shaft 36 (Figures 3, 4 and 7) has a pulley 133 secured thereto. A spring loaded tape 134 is passed around the pulley 133 and around a pulley 135 (Figures 3, 7 and 8) mounted on a shaft 136 carried by ball bearings 137 in strips 138 and 139 fixed to the frame of the weighing machine. A pen arm 140 is secured on the shaft 136. An ink carrying trough 141 is suspended by two rods 142 from the strip 139. A small tubular U-shaped pen 143 has one end thereof located in the ink in the trough 141 and the other end thereof encounters the chart 5. The lower end of the arm 140 has a strip 144 pivotally connected thereto, the strip being secured to the pen. The arrangement is such that as the lever 140 pivots about the axis of the shaft 136, the pen 143 is dragged or pushed along the trough 141 and draws a line on the chart 5.

Paper for the chart 5 is wound on a supply spindle 145 (Figure 8). From the spindle 145 the paper passes around a roller 146, around a roller 147, between rollers 148 and 149 onto a driven receiving drum 150. The spindle 145 and rollers 146, 147, 148, 149 and 150 are pivotally supported in members secured to the frame of the weighing machine. The roller 149 has a sprocket 151 around which passes a driving chain 152 which is driven by a sprocket 153 on the output shaft of a gear box 154, the input shaft (not shown) of which is driven by an electric motor. A belt 155 around one end of the drum 149, drives a pulley 156 which has a gear wheel 157 integral therewith. The gear wheel 157 meshes with a gear wheel 158 fixed to the drum 150.

Between the rollers 147 and 148, the paper on the chart 5 passes over a platform 159 supported by a bracket 160 fixed to the frame of the machine. The platform 159 is located immediately beneath the pen 143 and serves for supporting the chart whilst the pen is drawing a line thereon.

Ink troughs 161 are located adjacent the drum 146, there being one trough for each weighing unit. Each trough is secured to a bolt 162 which passes freely through an angle strip 163 fixed to the machine frame, and through a bar 164. A coiled spring 165 is located between the bottom of the trough 161 and the top of the strip 163. The spring 165 serves to urge the trough upwardly so that the head of the bolt 162 is forced against the bar 164. The bar 164 has a number of ink trough release knobs 166, only one of which is shown in Figure 7. These knobs have a threaded portion 167 screwed through the bar 164, the upper end of the threaded portion engaging the strip 163. By turning the knobs 166, the bar 164 can be moved towards or away from the strip 163 under control of the springs 165 thereby to vary the height of the troughs 161 with respect to the strip 163.

An inking roller 168 is located within each trough 161, the lower portion of this roller being submerged in the ink in the trough. The inking roller 168 is in contact with a grooved roller 169, which latter contacts the paper as it passes around the roller 146. The roller 169 has a plurality of parallel annular grooves around the periphery thereof, there being knife-like ridges 170 formed between adjacent grooves, which ridges are perpendicular to the axis of the roller 169.

A solenoid 171 is secured to the frame of the machine and the armature of the solenoid is connected by a pull rod 172 to one end 173B of a lever 173. The lever 173 is pivoted on a bracket 174 secured to the frame of the weighing machine. The end 173A of the lever 173 cooperates with a stamping plunger 175 which is mounted in the bracket 174 so as to be vertically slidable therein. The plunger 175 has a boss 176 located immediately beneath the chart 5 at one edge of the latter. Time and date mechanism 177 is mounted on the frame of the machine and is positioned immediately above the boss 176 and the edge of the chart 5. This mechanism 177 contains a clock and printing type (not shown) which latter is automatically altered in accordance with the time indicated by the clock. The mechanism 177 also includes date printing type which can be altered manually.

The weighing machine described above is connected, for example, for automatically weighing the constituents for making concrete. The different constituents are fed to separate hoppers and weighed therein. The hoppers subsequently empty their contents into a mixing machine or machines.

The shackle 9 of each weighing lever 1 is connected to the scale supporting one of the hoppers. As the hopper is loaded with material, the shackle 9 is pulled in the direction of the arrow 180 and hence the lever 1 rotates about the pivot 6 in a counterclockwise direction whereby the wire 32 and housing 57 are moved upwardly. The wire 32 pulls the arm 34 about the shaft 36 in a counterclockwise direction in opposition to the effect of the weight 42. As the lever 34 is rotated, the radius at which the weight acts about the shaft 36 increases, and hence the clockwise movement about the shaft 36 due to the weight 42 increases as the shaft 36 turns. On account of the segments 33, however, the radius at which the force in the wire 32 acts about the shaft 36 remains constant. The angle through which the shaft 36 turn is, therefore, a measure of the pull in the wire 32 and hence a measure of the weight of the material added to the hopper. As the shaft 36 turns, the gear wheel 43 turns therewith and drives the pinion 44. Rotation of the pinion 44 causes the pointer 52 to move over the graduated dial 53 and thereby give a visual indication of the weight of the material added to the hopper. When the hopper is empty, the rods 62, 63, 64 rest on the spring strips 77 whereby the switches 73, 74 and 75 will be closed. As the hopper is filled with material, the housing 57 will be raised until eventually the lower nut 66 encounters the crossbar 65 and the rod 62 is lifted from the switch 73 which opens. Such opening of this switch is connected to cause said second ram to move the feed control gate towards closing position and then to reciprocate in order to slow down the rate of flow of material into the hopper and cause the material to flow into the hopper in an intermittent manner. In this way, when the material in the hopper approaches the correct amount, the hopper will be fed with make-up material in relatively small quantities until the desired weight has been achieved. This slow-down prevents inaccuracy which might otherwise occur towards the end of the weighing operation due to the inertia inherent in a large quantity of material during loading. When the correct weight of material has been fed to the hopper, the rod 63 is lifted from the switch 74 which opens. The switch 74 is connected to cause the second ram completely to close the gate when the switch 74 is opened. When the hopper has been correctly filled, a light is illuminated on a central control panel and the operator can then close a switch to operate a solenoid, the energisation of which causes the first ram to open the hopper, whereby its contents are discharged into a mixing machine.

Should inadvertently an overweight of material be fed to the hopper, the housing 57 will be raised to such an extent that the rod 64 will permit the switch 75 to open. When the switch 75 opens a red lamp is illuminated on the control panel thereby indicating to the operator that it is necessary to remove surplus material from the hopper so as to reduce the quantity of material therein to the correct weight. The sprocket 153 (Figure 8) causes the roller 149, and roller 150, to be driven whereby the chart 5 is wound onto the roller 150. The grooved roller 169 is brought into contact with the paper of the chart at the location of the drum 146. This is done by appropriately manipulating the knobs 166 to raise the trough 161. When the roller 169 encounters the moving paper the roller 169 is caused to rotate whereby the roller 168 is also caused to rotate. The lower portion of the roller 168 is submerged in ink in the trough 161 and hence the periphery of the roller 168 is coated with ink. The tips of the ridges 170 on the roller 169 take up ink from the roller 168 and apply the ink to the paper thereby to cause a plurality of parallel lines to be ruled on the paper.

When a hopper is being filled, the shaft 36 of the weighing unit associated with the hopper rotates and causes a corresponding rotation of the shaft 136 through the intermediary of the pulleys 133 and 135 and the spring loaded tape 134. Rotation of the shaft 136 causes the arm 140 to swing and hence the pen 143 is moved from the position shown in Figure 7 to the right by an amount corresponding to the angle through which the arm 140 turns. The pen 143 causes a line to be traced on the chart 5 and as the amount by which the shaft 36 and hence the shaft 136 and arm 140 turn is a measure of the weight of material added to the hopper, so the distance by which the line traced on the chart extends across the chart to the right, is also a measure of the quantity of material added to the hopper. When the hopper is emptied, the weight 42 causes the lever 1, shaft 36, pointer 52, arm 140 and the pen 143 to move back to their initial positions. The total extent, therefore, to which the line traced on the chart has moved across the latter to the right (Figure 7) is a measure of the quantity of material emptied from the hopper. Whenever the operator closes the switch to empty the hopper, the solenoid 171 is energised whereby the rod 172 is pulled downwardly thus causing the plunger 175 to move upwardly. When this occurs the boss 176 presses the edge of the chart 5 against the exposed type of the time and date mechanism 177 and the time and date on which the weighing operation took place are printed on the edge of the chart opposite the line traced on the chart during the weighing operation. It will be realised that as the chart is operated upon by the pens 143 of all the weighing units of the weighing machine, the chart 5 forms a complete record of all the weighing operations that have been carried out in all the hoppers connected to the weighing machine.

When it is desired to change the relative proportions of the constituents in the concrete mix, it will be necessary to alter the amounts automatically weighed in each hopper. This is done by altering the position at which the switches 73, 74 and 75 are opened. The elevation of the switches is changed by moving the shaft 80 axially, so that a different bolt 82 encounters the platform 69. The bolts 82 have portions of differing length projecting below the shaft 80. The shaft 80 is moved axially by the mechanism shown in Figures 5 and 6. To operate this mechanism the handwheel 99 is moved to the left (Figure 5) until the studs 101 clear the member 97B. Such movement of the handwheel causes the shaft 98 to be translated axially to the left and hence the collar 103 pushes the yoke 104 to the left whereby the lever 109 is turned in an anticlockwise direction about the pins 108 against the action of the weight 110. Such turning of the lever 109 causes the link 111 to be pulled downwardly whereby the shaft 113 is turned in a clockwise direction (Figures 1 and 6). Such movement of the shaft 113 causes the bosses 132 thereon to encounter the undersides of the ends 69A of the platforms 69, whereby the platforms are turned in a clockwise direction so that they are brought out of contact with the lower ends of the bolts 82. To move the shaft 80 axially, the handwheel 99 is turned through, say, 120°. This causes the shaft 98 and the gear wheel 116 to turn through 120°, and the gear wheel 117 to be turned through a complete revolution. For one revolution of the gear wheel 117 the shaft 80 translates axially one pitch of the thread 119 and this corresponds to the distance between adjacent bolts 82 in a set of bolts 82 associated with a weighing unit. When moved axially through one pitch of the thread 119, the plunger 130 moves from one terminal 129 to the next one. The terminals 129 are connected in electric lamp circuits, having a common return through a battery to an earth on the framework of the weighing machine. When the plunger 130 encounters a terminal 129, a circuit through the framework, the plunger and the lamp associated with the terminal 129 contacted by the plunger will therefore be completed. The illumination of the lamps associated with the terminals 129 therefore gives an indication of which bolts 82 are positioned to be encountered by the platforms 69. When the handwheel 99 has been turned through 120° and the studs 101 are again appropriately positioned with the holes 102, the handwheel is pushed to the right (Figure 5) and the lever 109 moves back to its initial position under the action of the weight 110, whereby the shaft 113 is also turned back to its initial position. The platforms 69 therefore are turned in a counterclockwise direction about their pivots under the action of their associated springs 71, until they encounter the studs 82 now positioned immediately above the platforms.

Before use each weighing unit of the weighing machine is initially adjusted by screwing the pre-set screw 27 against the end 1A of the lever 1 until the desired weight is indicated on the dial 53 by the pointer 52. The handle 94 is then pushed downwardly so that the box spanner 91 engages over the head 96 of the bolt 82 that is engaging the platform 69. When so engaged the handle 94 is turned to screw the bolt down or up as may be required until the switch 74 is just open. It will be remembered that there is a lamp on the central control panel, which lamp is controlled by the switch 74, the lamp being illuminated when the switch 74 is opened. The handle 94 will be turned just until the lamp becomes illuminated, or if the lamp is initially illuminated, the handle will be turned until the lamp is extinguished and then turned back just until the lamp is illuminated.

The mix changing mechanism is then operated so that the next adjacent bolts 82 encounter the platforms 69 and the pre-set screws 27 are again adjusted until the new desired weights are indicated on the dials 53 by the pointers 52. The newly positioned bolts 82 are then adjusted until the switches 74 just open.

When a weighing unit is initially connected to the associated hopper, the position of the weight 11 on the lever 1 is adjusted so that zero weight is indicated on the dial 53 when the hopper is empty. That is to say, the weight 11 is used to counterbalance the weight of the empty hopper. The weight 11 may be used for roughly counterbalancing the weight of the empty hopper and the final counterbalancing being effected by adjustment of the weight 12 along the rod 13.

When hoppers are being used to weigh sand, the sand will probably contain a certain amount of moisture. The weight indicated on the dial 53, therefore, would indicate the weight of the dry sand plus the weight of water in the sand, if steps are not taken to correct for presence of the moisture. From time to time the percentage of moisture content of the sand being used is determined by any known method, and the weight 14 of the sand weighing unit is appropriately positioned along the lever 1 to counterbalance the quantity of water in the sand in the hopper. When the weighing unit is so corrected, the weight indicated on the dial 53 will be the weight of the dry sand in the hopper.

I claim:

1. In a weighing machine, a combination, a frame, a plurality of weighing units in aligned relation in said frame, each of said units having a weight responsive lever pivotally connected to said frame, a supporting member connected to and movable with said lever, a plurality of contact members movable up and down with respect to said supporting member, a plurality of switches respectively in the paths of movement of said contact members and adapted to be engaged by said contact members for predetermined different lengths of time in the course of a working movement of said supporting member, said contact members hanging from said supporting member when respectively out of engagement with said switches, a support connected to said frame, said switches being mounted on said support, means for varying the elevation of said switches to correspondingly vary the time of said contacts respectively between said contact members and said switches, and a single control for each of said units in alignment with each of said supports, whereby each of said supports may be simultaneously adjusted by said control.

2. In a weighing machine, in combination, a plurality of weighing units in side-by-side arrangement, a weight responsive lever in each of said units, said levers extending longitudinally in side-by-side arrangement, a depending contact supporting member pivotally connected to each of said levers, said contact support members being in side-by-side relation, a plurality of transversely aligned contact rods depending from each of said supporting members, a plurality of respectively cooperating switches mounted in each of said units in the path of movement of the contact rods in said respective units, said contact rods in each unit having limited movement relative to their supporting member, means for adjusting the distance between the contact rods and switches respectively in each unit to predetermine the actuation period of switches in each unit in accord with the selected weighing operation of such unit, a transversely movable mix-change handle at one side of said machine, a movable support for said switches in each of said units, a plurality of projections in transverse alignment in each of said units to fix the position of said support to position said switches, said projections being of different lengths, and common means for transversely shifting said projections to select one thereof to cooperate with said support in each weighing unit to predetermine the load respectively weighable by said unit.

References Cited in the file of this patent

UNITED STATES PATENTS

| Number | Name | Date |
|---|---|---|
| 857,164 | Edtbauer | June 18, 1907 |
| 1,986,268 | Hughes et al. | Jan. 1, 1935 |
| 2,038,746 | Madsen et al. | Apr. 28, 1936 |
| 2,044,017 | Robb | June 16, 1936 |
| 2,299,636 | Mansbendel | Oct. 20, 1942 |
| 2,343,000 | Carliss | Feb. 29, 1944 |
| 2,398,643 | Jerome | Apr. 16, 1946 |
| 2,503,295 | Palmer | Apr. 11, 1950 |
| 2,559,307 | Martinson | July 3, 1951 |
| 2,591,034 | Wilson | Apr. 1, 1952 |

U. S. DEPARTMENT OF COMMERCE
PATENT OFFICE

CERTIFICATE OF CORRECTION

Patent No. 2,828,100                                                  March 25, 1958

James Ernest Conacher

It is hereby certified that error appears in the printed specification of the above numbered patent requiring correction and that the said Letters Patent should read as corrected below.

Column 6, line 25, for "turn" read -- turns --; column 8, line 64, for "a combination" read -- in combination --.

Signed and sealed this 6th day of May 1958.

(SEAL)
Attest:

KARL H. AXLINE
Attesting Officer

ROBERT C. WATSON
Commissioner of Patents